US012811454B2

(12) United States Patent
Wawer et al.

(10) Patent No.: US 12,811,454 B2
(45) Date of Patent: Nov. 24, 2026

(54) CLUSTER ASSEMBLY FOR COIL CONNECTION, CONTACTING AND ELECTRICAL INSULATION OF A STATOR UNIT, AND METHOD FOR PRODUCING A STATOR INSULATION SYSTEM

(71) Applicant: Hanon Systems, Daejeon (KR)

(72) Inventors: Jürgen Wawer, Mechernich (DE); Florian Semmler, Cologne (DE)

(73) Assignee: HANON SYSTEMS (KR)

( * ) Notice: Subject to any disclaimer, the term of this patent is extended or adjusted under 35 U.S.C. 154(b) by 176 days.

(21) Appl. No.: 18/608,080

(22) Filed: Mar. 18, 2024

(65) Prior Publication Data

US 2024/0313596 A1 Sep. 19, 2024

(30) Foreign Application Priority Data

Mar. 16, 2023 (DE) ..................... 10 2023 106 612.9
Feb. 16, 2024 (DE) ..................... 10 2024 104 394.6

(51) Int. Cl.

*H02K 3/12* (2006.01)
*H02K 1/16* (2006.01)
*H02K 15/10* (2025.01)

(52) U.S. Cl.

CPC ................. *H02K 3/12* (2013.01); *H02K 1/16* (2013.01); *H02K 15/105* (2013.01)

(58) Field of Classification Search

CPC .......... H02K 3/12; H02K 1/16; H02K 15/105; H02K 3/522; H02K 3/50; H02K 3/38; H02K 2213/03; H02K 3/521; H02K 3/32; H02K 15/10; H02K 15/12

USPC .......................................................... 310/208

See application file for complete search history.

(56) References Cited

U.S. PATENT DOCUMENTS 4,313,076 A * 1/1982 Rathje ....................... H02P 1/42
318/785
4,537,067 A * 8/1985 Sharp .................... E21B 47/022
73/152.13
2019/0203715 A1* 7/2019 Heo ....................... H02K 3/522
2020/0036255 A1* 1/2020 Shirai .................... H02K 3/522
(Continued)

FOREIGN PATENT DOCUMENTS

JP 2011182512 A 9/2011
JP 2020114053 A 7/2020
(Continued)

*Primary Examiner* — Charles Reid, Jr.
(74) *Attorney, Agent, or Firm* — Shumaker, Loop & Kendrick, LLP; James D. Miller

(57) ABSTRACT

A cluster assembly for coil connection, electrical contact, and electrical insulation of a stator unit of an electric motor for-driving a refrigerant compressor, the cluster assembly including an annular cluster and at least one side closure ring segment. The side closure ring segment secures the connection of three wire ends either to first connecting elements or to second connecting elements and provides electrical insulation through a mounting connection on the outer circumference of the annular cluster. Further, a stator unit includes a corresponding cluster assembly, and a method for producing a stator insulation system for the stator unit. Vessels are formed by mounting the side closure ring segments on the cluster, each of which surrounds a contact point and which are filled with a casting compound of an insulating filling material.

12 Claims, 12 Drawing Sheets

(56) References Cited

U.S. PATENT DOCUMENTS

| | | | | |
|---|---|---|---|---|
| 2022/0324298 | A1* | 10/2022 | Walisko | H02K 15/10 |
| 2023/0006505 | A1* | 1/2023 | Prucher | H02K 11/40 |
| 2024/0097517 | A1* | 3/2024 | Walisko | H02K 3/32 |
| 2024/0313604 | A1* | 9/2024 | Walisko | H02K 3/522 |

FOREIGN PATENT DOCUMENTS

| | | | |
|---|---|---|---|
| KR | 1020180067821 | A | 6/2018 |
| WO | 2017138534 | A1 | 8/2017 |

* cited by examiner

CLUSTER ASSEMBLY FOR COIL CONNECTION, CONTACTING AND ELECTRICAL INSULATION OF A STATOR UNIT, AND METHOD FOR PRODUCING A STATOR INSULATION SYSTEM

CROSS-REFERENCE TO RELATED APPLICATIONS

The present application claims the benefit of and priority to German Patent Application No. 10 2024 104 394.6, filed Feb. 16, 2024 and German Patent Application No. 10 2023 106 612.9 filed Mar. 16, 2023, the entire contents of each of which are incorporated herein for all purposes by reference.

FIELD

The invention relates to a cluster assembly for coil connection, contacting and electrical insulation of a stator unit of an electric motor for driving a refrigerant compressor, in particular a refrigerant compressor for a motor vehicle air conditioning system. The invention further relates to a stator unit which comprises a corresponding cluster assembly. In addition, the invention relates to a method for producing a stator insulation system for a stator unit.

BACKGROUND

Due to a high voltage range of up to 1000 volts, the requirements regarding the insulation coordination of stators in electrically operated refrigerant compressors are extremely high. Such requirements for insulation coordination relate in particular to the so-called air distance as the shortest distance in the air between two conductive particles and the so-called leakage current length as the shortest distance along the surface of an insulating material between these two conductive particles.

To ensure or maintain the insulation coordination of stators in electrically operated refrigerant compressors, for example, contact points or transition connections must be electrically insulated accordingly, since the oil-refrigerant mixture flowing through the electrical refrigerant compressor is electrically conductive. This applies to all welded or fused contact points or transition connections of both the stator coil winding to a busbar star point and the stator coil winding to an electrical connector system (E-pin system), in particular contact points where wires of the coil winding are connected by welding or fusing to a busbar or to the busbar star point. Once welded or fused, these contact points are still exposed to air and require appropriate protective covering to meet insulation coordination with regard to concerning air gap and leakage current.

Due to the close packing of the stator and a cluster, i.e. an assembly with insulating parts as well as busbars and other conductor parts, this is typically achieved using a liquid casting compound as an insulating filling material, which cures to form a solid block and withstands all suspected influences of the combination of refrigerant and oil as well as those mechanical in nature and due to use. Epoxy resin, for example, is suitable as an insulating filling material or casting compound, although subsequent curing is necessary. The electrical insulation can be achieved by any type of casting of a vessel with casting compound, by additional downstream plastic overmolding or similar methods in a more or less complex process. It may be necessary to create extra vessels to receive the casting compound, which require complex measures, tools, additional components and process steps or similar.

A suitable protective covering must be designed in such a way that it:

- forms suitable vessels for accommodating an insulating filling material, preferably a liquid epoxy resin casting compound,
- remains in position while being attached to other stator or cluster parts,
- avoids any escape of epoxy resin at any interfaces to the stator coil winding area,
- can hold as much epoxy resin as possible through a suitable sector or cutout pattern design,
- does not project beyond the outer diameter of the stator package,
- is easy to assemble, and
- provides suitable and robust insulation efficiency with regard to the air gap and the leakage current requirements as well as high voltage protection under all operating conditions.

SUMMARY

It is the object of the invention to solve the challenges described above as compared to the prior art with as little complexity as possible and thus more easily and cost-effectively in the given installation space and in combination with a stator-cluster connection.

The object is achieved by a cluster assembly according to claim 1 for coil connection, contacting and insulation of a stator unit of an electric motor for driving a refrigerant compressor, a stator unit comprising such a cluster assembly, and by a method for producing a stator insulation system for a corresponding stator unit. Refinements are specified in the dependent claims.

The cluster assembly according to the invention for coil connection, contacting and insulation of a stator unit of an electric motor, which is suitable for driving a refrigerant compressor, comprises:

- an annular cluster, having
  - an annular support part formed by injection molding and overmolding with an insulating cover,
  - three first connecting elements for a connection to wire ends of three-phase wires of a stator winding on one side of the stator core of the stator unit, and three first conductor parts, each connected with one of the first connecting elements, and
  - three second connecting elements of a common second conductor part for an electrical connection of three wire ends to one another on a side of the stator winding opposite the wire connections to the first connecting elements, wherein the cluster has cutout areas without an insulation cover, in which the three first connecting elements and/or the second connecting elements project radially outwards from the injection-molded support part of the cluster and protrude axially outwards from the injection-molded support part of the cluster, and
  - at least one side closure ring segment securing the connection of the three wire ends to the first connecting elements or the three wire ends to the second connecting elements and their insulation by means of a mounting connection on the outer circumference of the annular cluster, wherein the side closure ring segment corresponds to one of the insulation cover-free cutout areas of the cluster in each case.

By assembling the at least one side closure ring segment, a plurality of vessels for filling with an electrically insulating filling material are advantageously formed in at least one of the cutout areas, each of which encloses a space around a contact point of a connecting element with a wire end.

According to an advantageous embodiment of the invention, the cluster has at least two arcuate cluster base parts, by means of which the cluster can be placed on an axial wall surface of a hollow cylindrical stator core of the stator unit. The conductor parts and their connecting elements are carried by the annular support part and are at least partially enclosed therein. In addition to the insulation cover already mentioned, the support part preferably comprises a base plate. Advantageously, the arcuate cluster base parts are connected to the insulation cover and extend from the insulation cover, which is positioned above the base plate, in the axial direction facing the stator core into an area below the base plate. The cluster base parts generally run along the outer circumference of the annular cluster and are spaced apart from one another in the circumferential direction. According to an advantageous embodiment of the invention, the at least one side closure ring segment, which is attached to the cluster by the assembly connection, comprises a curved outer ring segment wall and several radial projections formed on a concave inside of the ring segment wall and arranged to be distributed in the direction of curvature of the ring segment wall.

In the cutout areas that are not covered by the insulation cover, there are preferably sections of the base plate whose outer edges run in the circumferential direction between the spaced-apart cluster base parts. Three contact points arranged to be distributed in the circumferential direction are formed in the cutout areas, at each of which a connecting element of a conductor part passing through the insulation cover in the radial direction is positioned in such a way that it is connectable to a wire end of a lead wire of a coil passing in the axial direction through a recess in the base plate.

According to a particularly advantageous embodiment of the invention, at least two side closure ring segments are attached in the circumferential direction of the cluster between two cluster base parts in each case in such a way that the cluster base parts and the outer ring segment walls together form a closed outer ring, and that the radial projections rest on the base plate and rest on a wall of the insulation cover opposite the inside of the ring segment wall, whereby several vessels are formed in the cutout areas, each of which encloses a space around a contact point. These vessels are provided to receive a filling material that electrically insulates the respective contact point, for example an epoxy resin.

Statements such as "above the base plate" are used in the context of the description of the invention or embodiments of the invention in order to describe the position of a feature that faces the side of the base plate that does not point in the axial direction of the stator core to the stator coil winding area, but points in the opposite direction and is referred to as the top of the base plate. Accordingly, statements such as "below the base plate" refer to the position of a feature that faces the side of the base plate that points in the axial direction of the stator core into the space of the stator coil winding area and represents the bottom of the base plate.

The core of the invention is the application of the side closure ring segment described above for a stator insulation system and to save casting compound or epoxy resin.

The connection of the lead wires of coils, usually three phase and three star point wires, to the cluster of the stator unit after the winding process takes place without any further wire routing effort. The wound lead wires can be easily guided axially from the stator coil winding area to the respective interface above to the respective conductor part, for example to an E-pin or a star point busbar contact, in the shortest possible way. The wire ends are welded to the connecting elements of the respective conductor part at the contact points or connected by fusing and must then be electrically insulated. The cluster "floats" on a basic insulation obtained by stator overmolding, consequently the side closure ring segment should not only form the vessel for the filling of filling material, preferably an epoxy resin filling, for electrical insulation of the welded or fused contact point, but also ensure the interface between cluster and stator overmolding in order to avoid air and leakage current formation to the stator core or compressor motor housing.

This complex insulation coordination task, which involves a large number of contact points, interfaces and transition connections, is achieved by using the at least one side closure ring segment.

The side closure ring segment, which can also be referred to as side closer or outer ring locking clip according to its function, fulfills all the above desired properties in a skillful, simple, effective, robust and cost-effective manner. The at least one side closure ring segment can be embodied as a one-piece plastic injection-molded part, which can be produced in a simple injection mold. In addition, the at least one side closure ring segment used according to the invention also fulfills this task in the given installation space. This can be provided, without limitation, by projections integrated into the side closure ring segment, which serve as construction elements (spacers) for the formation of vessels to receive and secure the insulating filling material.

According to an advantageous embodiment of the invention, the cutout areas each have radial recesses on their outer edges, which are preferably formed by the base plate, through which lead wires from the winding area of the coils can be passed axially in each case in the direction of the contact points. In this case, the side closure ring segment or the side closure ring segments preferably has/have a number of side closing elements on the inside of the ring segment wall, distributed in the direction of curvature of the ring segment wall, which correspond to the radial recesses in the respective cutout area in terms of shape, position, number and distribution, whereby the radial recesses are at least partially closed. The radial recesses should advantageously be closed at least to such an extent that no casting compound can escape into the stator coil winding area through these recesses.

In addition, the respective side closure ring segment is advantageously provided with clamp elements which are parts of a snap connection system by means of which the side closure ring segment is mounted on the cluster. Typically, the at least one side closure ring segment has two outer clamp elements which are designed in the form of a radial projection on each of the two ends of the ring segment wall of the side closure ring segment that are opposite each other in the direction of curvature of the ring segment wall, which projection has a hook-shaped end pointing outwards in the direction of curvature. Preferably, these outer clamp elements, as well as most of the other projections, are placed in an upper part of the outer ring segment wall, that is to say in the part of the outer ring segment wall which, after assembly with the cluster, is above the outer edge of the base plate, so that they engage laterally a top of the cluster for attaching to the cluster, i.e. the area above the base plate. According to a further embodiment, the at least one side closure ring segment has at least two lower clamp elements which are positioned and arranged on the inside of the outer ring segment wall so that they engage a bottom of the base plate of the cluster. The above-mentioned clamp elements facilitate both a radial and an axial installation direction of the side closure ring segment.

A further aspect of the invention relates to a stator unit in which the cluster assembly according to the invention is mounted for coil connection, contacting and electrical insulation. The stator unit comprises a stator core having at least substantially the shape of a hollow cylinder, which has coil webs on its inside that are arranged to be evenly distributed over its circumference and directed radially inwards relative to its cross section, wherein lead wires forming coils are wound around the coil webs, which are divided into at least three phases, and wherein the stator core is provided with basic insulation formed between the stator core and the wound coils. The annular cluster is preferably placed on an axial wall surface of the hollow cylindrical stator core of the stator unit by means of at least two arcuate cluster base parts. According to a preferred configuration of the invention, at contact points in the cutout areas, the connecting elements of the conductor parts are connected in each case to a wire end of a lead wire of a coil passing through a recess in the base plate in the axial direction at contact points in the cutout areas, and wherein vessels enclosing a space around a contact point in each case, which are formed by assembling the cluster with the at least one ring segment, are filled with an electrically insulating filling material.

According to an advantageous configuration of the invention, the at least one side closure ring segment is placed with its contact surface on a wall step formed by the basic insulation on the axial wall surface of the stator core. Preferably, the extent of the side closure ring segment in the axial direction can be shorter than that of the adjacent cluster base parts. Such a wall step extends the leakage current length from a conductive part, the lead wire of a coil, to the metal of the axial wall surface of the stator core, thus helping to meet the leakage current requirements in stator units in electrically operated refrigerant compressors.

A method according to the invention for producing a stator insulation system for the stator unit described above comprises the following steps:

- overmolding the stator core, on the inside of which coil webs directed radially inwards relative to its cross section and around which lead wires are completely wound to form coils, are arranged to be evenly distributed over its circumference, with a plastic for the formation of basic insulation,
  - aligning the wire ends of the lead wires in the axial direction,
- mounting the cluster on the overmolded stator core provided with the basic insulation, the cluster being placed on an axial wall surface of the stator core and the wire ends being connected to the connecting elements of the conductor parts of the cluster at contact points,
- attaching the at least one side closure ring segment, wherein vessels surrounding a contact point in each case are formed by mounting the side closure ring segments on the cluster,
  - filling the vessels with a casting compound of an insulating filling material.

The at least one side closure ring segment can be mounted on the cluster in a radial, an axial direction or a combination of both directions. An epoxy resin is preferably used as the insulating filling material. The at least one side closure ring segment also enables savings in insulating filling material, because filling the vessels formed by mounting the at least one side closure ring segment does not require large amounts of casting compound. In addition, the construction elements of the at least one side closure ring segment are also advantageously suitable for preventing the escape of casting compound.

In addition, the process for producing a stator insulation system requires fewer process steps, fewer components and fewer tools, which reduces the complexity of the process. As a result, the reduction in components that can fail also leads to an increase in the robustness and improved quality of the stator unit.

BRIEF DESCRIPTION OF THE DRAWINGS

Further details, features and advantages of configurations of the invention are evident from the following description of exemplary embodiments with reference to the associated drawings. In the figures.

DETAILED DESCRIPTION

Figure 1A:
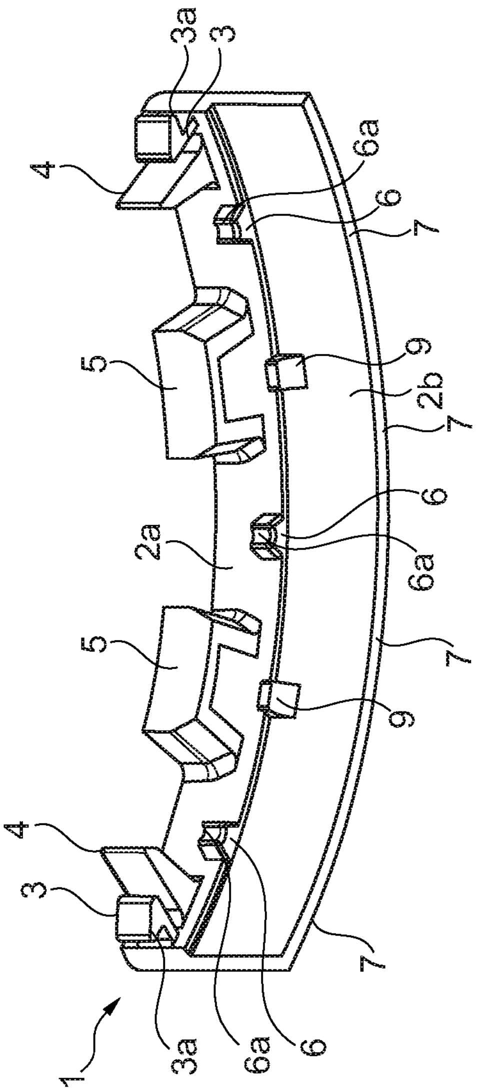
FIG. 1A: shows a perspective representation of a side closure ring segment with a view of its inside and bottom as well as various projections and clamp elements.
Figure 1B:
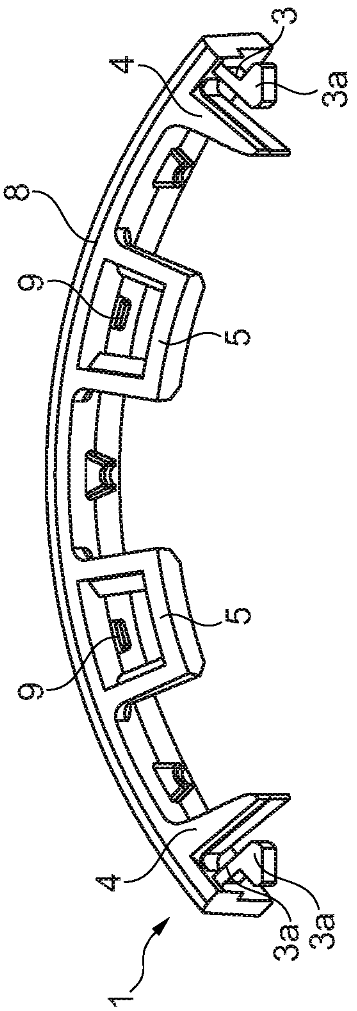
FIG. 1B: shows a perspective representation of the side closure ring segment with a view of the inside and top as well as various projections and clamp elements.

Figures FIG. 1A and FIG. 1B show a side closure ring segment 1 which enables a protective covering with the above-mentioned properties in a skillful, simple, effective, robust and cost-effective manner. The side closure ring segment 1 comprises an outer curved ring segment wall 2 with a convexly curved outside and a concavely curved inside. In an upper part 2*a* of the outer ring segment wall 2, a plurality of radial projections are formed on the concave inside. At each of the two opposite ends of the ring segment wall 2 in the direction of curvature of the ring segment wall 2, a radial projection is formed in the form of an outer clamp element 3, which has a hook-shaped end 3*a* pointing outwards in the direction of curvature. The clamp elements 3 serve to hold and position the side closure ring segment 1 after assembly on a cluster, as shown in further figures that follow and with which at least one side closure ring segment 1 forms a cluster assembly. Furthermore, several radial projections 4, 5 are placed between the outer clamp elements 3 in the direction of curvature on the inside of the outer ring segment wall 2. In the configuration shown in the figures FIG. 1A and FIG. 1B, there are different shapes of such radial projections 4, 5. This is to say, there are simple radial projections 4, which are each adjacent to an outer clamp element 3 in the direction of curvature, with two frame-shaped projections 5 being placed between these simple radial projections 4 in the direction of curvature. In addition, on the inside of the outer ring segment wall 2 according to the embodiment in the figures FIG. 1A and FIG. 1B, another three projections are placed, which are referred to as side closing elements 6. These side closing elements 6 are each located at a lower edge of the upper part 2*a* of the outer ring segment wall 2 and are distributed in the direction of curvature so that they are always positioned between radial projections 4, 5 in the direction of curvature. As can be seen in FIG. 1A, the free ends 6*a* of these radial projections or side closing elements 6 have a concave curvature with the same direction of curvature as the direction of curvature of the ring segment wall 2.

The figures FIG. 1A and FIG. 1B show the side closure ring segment 1 from different perspectives in each case, wherein FIG. 1A shows a view on the concavely curved interior and on a contact surface 7 of the side closure ring segment 1 which, upon installation of the side closure ring segment 1 in the axial direction points to the interior of the stator unit and contacts an axial wall surface of the stator core or an attached step of the basic insulation, and FIG. 1B mainly shows a view on the opposite upper surface 8 of the side closure ring segment 1, which points axially outwards and is on a plane with the adjacent upper surfaces of the simple radial projections 4 and the frame-shaped projections 5. In FIG. 1A it can be seen that the lower edge of the upper part 2*a* and thus the entire upper part 2*a* of the outer ring segment wall 2 protrudes radially inwards compared to the lower part 2*b* of the outer ring segment wall 2. At this lower edge of the upper part 2*a* of the outer ring segment wall 2, as already mentioned, side closing elements 6 are arranged as radial projections on the inside of the ring segment wall 2, distributed in the direction of curvature. A total of two lower clamp elements 9 are designed as radial projections below the edge. In contrast to the outer clamping elements 3, the side closing elements 6, the simple radial projections 4 and the frame-shaped projections 5, which protrude on the inside of the upper part 2*a*, these lower clamping elements 9 are located on the inside of the lower part 2*b* of the outer ring segment wall 2. The lower clamp elements 9 are each arranged between two side closing elements 6 adjacent to the lower edge of the upper part 2*a* in the direction of curvature. As can be seen from both FIG. 1A and FIG. 1B, the lower clamping elements 9 are located below the frame-shaped projections 5 in the axial direction. Thus, in addition to the two larger, outer clamping elements 3 which are provided for engaging laterally a top of a cluster for attachment to said cluster not shown in the figures FIG. 1A and FIG. 1B, the side closure ring segment 1 has two smaller, lower clamp elements 9, which can engage a bottom of the cluster in order to hold and position the side closure ring segment 1 after mounting.

Figure 2:
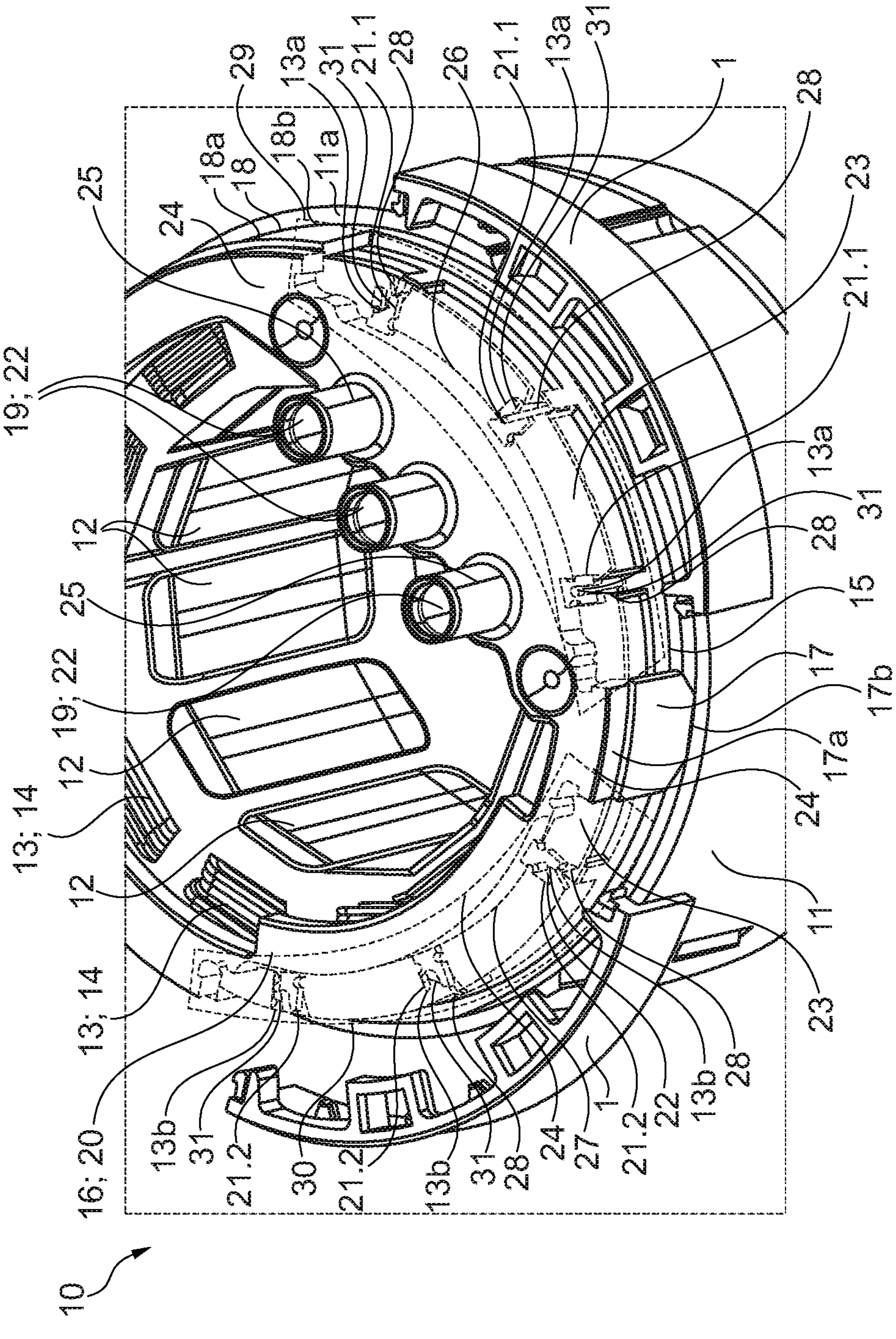
FIG. 2: shows a perspective schematic representation of a stator core of a stator unit with a mounted cluster and two side closure ring segments detached from it or not yet mounted.

FIG. 2 shows a perspective representation of the not yet fully assembled parts of a stator unit 10 of an electric motor for driving a refrigerant compressor, that is, a stator unit 10 with two side closure ring segments 1 that are detached from the other parts of the stator unit 10 or have not yet been mounted. The stator unit 10 comprises a stator core 11 having at least substantially the shape of a hollow cylinder, which has coil webs 12 on its inside that are arranged to be evenly distributed over its circumference and directed radially inwards relative to its cross section, wherein lead wires 13 forming coils 14 are wound around the coil webs, which are divided into at least three phases. The stator core 11 is provided with a basic insulation 15, which is formed, without limitation, between the stator core 11 and the wound coils 14, partially visible in FIG. 2, and which can be obtained by overmolding the stator core 11 with, for example, a plastic such as polyamide PA 66. In addition, the stator unit 10 comprises a substantially annular cluster 16, which, with arcuate cluster base parts 17, 18, is placed on an outer axial wall surface 11*a* of the stator core 11. This cluster 16 “floating” on the basic insulation 15 comprises a coil connection means, an interface 19 to a motor drive control unit and a support part 20 for the coil connection means and for the interface 19. The coil connection means comprises three first conductor parts, each with one of three first connecting elements 21.1 for connecting wire ends 13*a* of phase wires to line elements 22 of the interface 19 to the motor drive control unit. In addition, the coil connection means comprises at least one second conductor part, such as, for example, a busbar, which has second connecting elements 21.2 for connecting this conductor part or this busbar to further wire ends 13*b* of the lead wires 13 of the coils 14. According to FIG. 2, the line elements 22 of the interface 19 are embodied as three plug connector connections (E-pin connections). The support part 20 comprises a base plate 23 and an insulating cover 24 and overall has a substantially circular ring shape with a circular outer contour. The at least one second conductor part for connecting coils (busbar star circuit) and the first conductor parts for connecting the coils 14 to the line elements 22 of the interface 19 to the motor drive control unit are each covered by the insulation cover 24 and enclosed within the support part 20. In addition, the insulation cover 24 has tubular sleeves 25 corresponding to the line elements 22 in the area of the interface 19 to the motor drive control unit, which encase the line elements 22. The connecting elements 21.1, 21.2 of the enclosed conductor parts each pass through one of a total of two radial side walls 26, 27 of the insulation cover 24 in the radial direction.

Each of the connecting elements 21.1, 21.2 has a forked end with which they extend above one of two outer areas of the base plate 23 in each case that rest on one of the radial side walls 26, 27 and are not covered by the insulation cover 24 and have an arcuate outer contour to an area above one of several radial V-shaped recesses 28 on the outer edge of the base plate 23. The areas of the cluster 16 that are not covered by the insulation cover 24 of the support part 20 and into which the connecting elements 21.1, 21.2 project radially are referred to below as cutout areas 29, 30. A wire end 13*a*; 13*b* of a coil or a coil strand passes through each of the radial recesses 28 in the axial direction. The forked ends of the connecting elements 21.1, 21.2 are aligned in such a way that the wire ends 13*a*; 13*b* running in the axial direction are inserted from below, that is to say, coming from the coils 14 in the stator core 11, into the forked ends. The points where the connecting elements 21.1, 21.2 are electrically connected to the wire ends 13*a*; 13*b* of the coils 14 or coil strands, are also referred to below as contact points 31.

According to the exemplary embodiment shown in FIG. 2, the three wire ends 13*a* of the phase wires are connected to connecting elements 21.1 of conductor parts of the cluster 16 in a first cutout area 29. These first conductor parts, which are connected to the line elements 22 of the interface 19, are not visible in FIG. 2. The contact points 31 of the stator coil winding to a further, not shown, second conductor part of the cluster 16, for example a busbar star point, are in a further, second cutout area 30, with the connecting elements 21.2 connected to this conductor part being connected to the wire ends 13*b* at these contact points 31.

According to the embodiment shown in FIG. 2, the support part 20 comprises a first, smaller cluster base part 17 and a second, larger cluster base part 18, each connected with a first end 17*a*; 18*a* to the insulation cover 24 and each resting with a second end 17*b*; 18*b* on the outer axial wall surface 11*a* of the stator core 11. The cluster base parts 17, 18, with their respective second ends 17*b*; 18*b*, are directed in the axial direction downwards, that is to say, directed towards the stator core 11, and run over the outer edge of the base plate 23 to the axial wall surface 11*a* of the stator core 11, which is located below the plane of the base plate 23. In the exemplary embodiment shown in FIG. 2, each of the two cluster base parts 17, 18 runs along different, differently sized areas of the outer circumference of the circular ring-shaped support part 20, with the insulation cover 24 in these areas extending in the radial direction up to the circular outer edge of the circular ring-shaped support part 20. The designations as smaller cluster base part 17 and as larger cluster base part 18 each refer to the different sizes of the cluster base parts 17, 18 in the circumferential direction of the circular ring-shaped support part 20 or in the circumferential direction of the stator core 11. The two cluster base parts 17, 18 running over a part of the circumference of the annular support part 20 in each case are spaced apart from one another on both sides in the circumferential direction, with a cutout area 29; 30 with contact points 31 in each case extending on both sides between the cluster base parts 17, 18 in the circumferential direction, which is not covered by the insulation cover 24.

Figure 3:
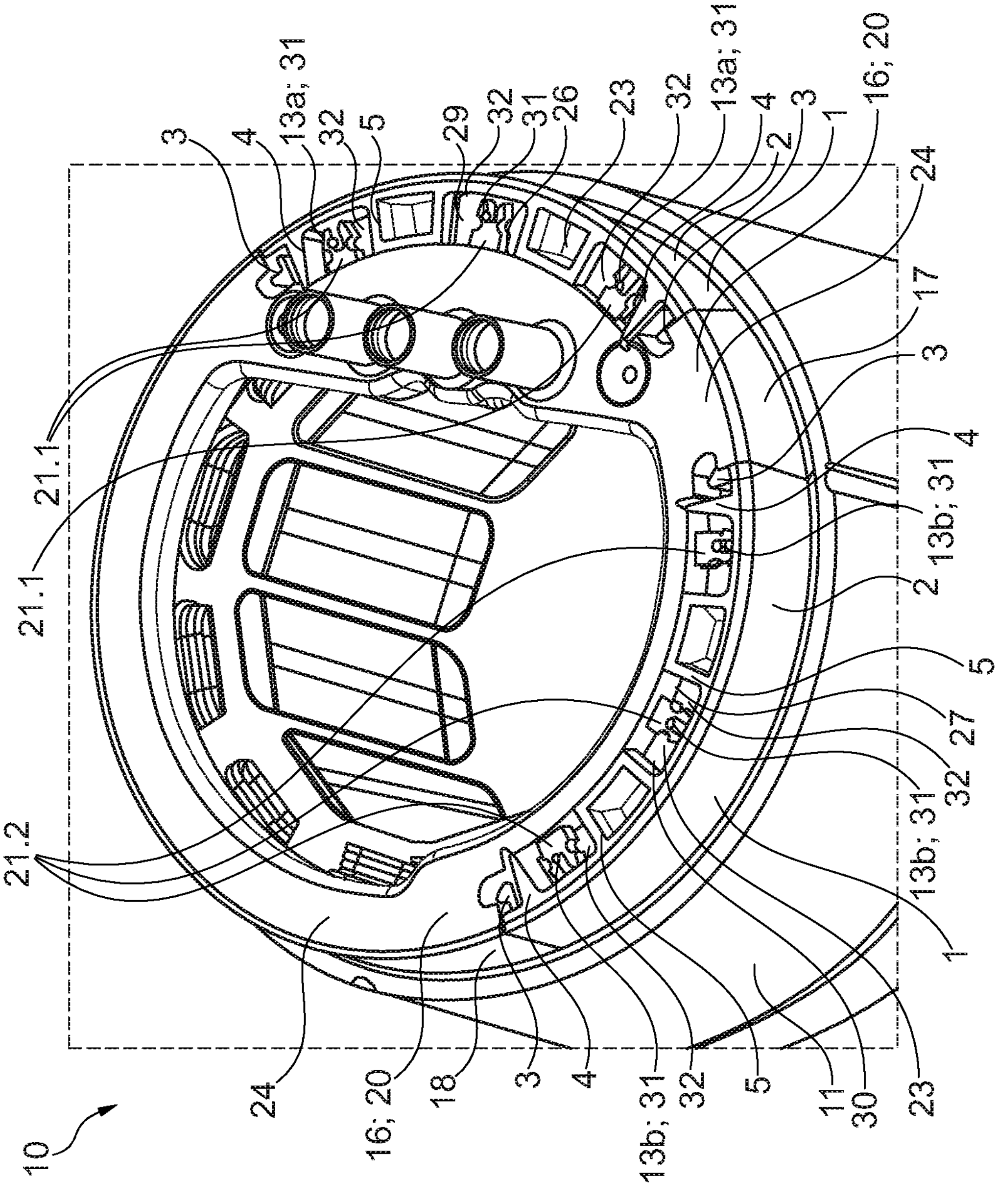
FIG. 3: shows a perspective representation of a stator unit with a view of a cluster with the two mounted side closure ring segments and with exposed contact points that have not yet been cast.

While FIG. 2 shows the cast stator core 11 of the stator unit 10 with the cluster 16 mounted on the basic insulation 15 of the stator core 11 and two side closure ring segments 1 detached from it or not yet assembled, FIG. 3 shows a perspective representation of a stator unit 10 in which two side closure ring segments 1 are mounted on cluster 16 placed on the stator core 11.

On the one hand, by mounting the side closure ring segments 1 on the cluster 16 on the outer circumference of the support part 20 or on the outer edges of the cutout areas 29, 30, the gaps between the circular arc-shaped cluster base parts 17, 18 are closed. Consequently, a closed outer ring, comprising the cluster base parts 17, 18 and the two outer ring segment walls 2 of the side closure ring segments 1, is obtained, which encloses the support part 20 of the cluster 16 over the entire circumference, including the outer edges of the base plate 23 in the cutout areas 29, 30. In conjunction with clamp elements 3 with which the side closure ring segments 1 are attached to the cluster 16, the side closure ring segments 1 can also be referred to as "outer ring closing clamps" according to their function.

On the other hand, mounting the side closure ring segment 1 on the cluster 16 also results in the contact points 31 being placed within vessels 32. According to the exemplary embodiment shown in FIG. 3, these vessels 32 are each created by the ends of the radial projections 4, 5 of the side closure ring segment 1 resting against the radial side wall 26, 27 of the insulation cover 24. This way, the vessels 32 are each delimited in the circumferential direction of the cluster 16 by two opposing boundary walls, which are each formed by two of the radial projections 4, 5, and in the radial direction by the outer ring segment wall 2 and the side walls 26, 27 of the insulation cover 24, which are opposite each other further inside in the radial direction. The side closure ring segment 1 is attached to the support part 20 of the cluster 16, as can be seen in FIG. 3, without limitation, by means of the outer clamp elements 3.

Figure 4A:
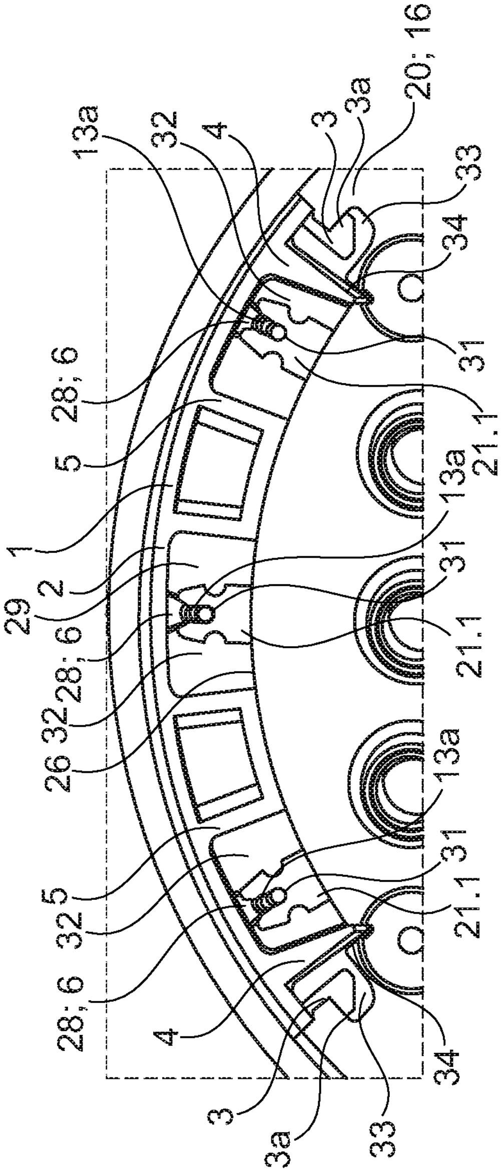
FIG. 4A: shows a partial view of the stator unit with a side closure ring segment attached to the cluster and with contact points at which a connecting element of a conductor part is connected to a coil wire and around which a vessel is formed.

A more detailed representation of the connection between the cluster 16 and a side closure ring segment 1 is shown in FIG. 4A, in which part of an end face of the stator unit is shown with a side closure ring segment 1 attached to the cluster 16 and contact points 31. At each of the contact points 31, a first connecting element 21.1 of a first conductor part is connected to a wire end 13*a* of a phase wire. The side closure ring segment 1 forms a connection, for example a clamping connection or a snap connection, with the support part 20 of the cluster 16 by receiving the hook-shaped ends 3*a* of the outer clamp elements 3 in corresponding recesses 33 of the support part 20 of the cluster 16.

As already mentioned, the vessels 32 are each delimited in the circumferential direction of the cluster 16 by two opposing boundary walls, which are each formed by two of the radial projections 4, 5, and in the radial direction by the outer ring segment wall 2 and the opposite side wall 26 of the insulation cover 24 of the cluster 16 further inside in the radial direction.

Two vessels 32 are each delimited by radial projections 4, 5 of different shape. A vessel 32 is placed in the circumferential direction between these vessels 32, which is delimited by two identical, frame-shaped projections 5. While the frame-shaped projections 5 rest on the side wall 26 of the insulation cover 24, which is also curved in the circumferential direction with a front end face curved in the circumferential direction, the simple radial projections 4, as shown in FIG. 4A, are each partially received at their free end by a further recess 34 in the support part 20. In addition to the task of providing boundary walls for vessels, the simple radial projections 4 fulfill a further function, namely, similar to the clamp elements 3, to hold and position the side closure ring segment 1 after mounting to a cluster 16.

As can also be seen in figure FIG. 4A, the side closing elements 6 that are formed on the inside of the outer ring segment wall 2 of the side closure ring segment 1 are received in the radial, V-shaped recesses 28 through which the wire ends 13*a* at the outer edge of the cutout area 29 pass to the forked ends of the connecting elements 21.1 aligned above. That is to say, the side closing elements 6 correspond to the radial recesses 28 on the outer edge of the cutout area 29 and have the task of preventing casting compound of insulating filling material from escaping through the recesses 28 into the winding space of the stator unit.

Figure 4B:
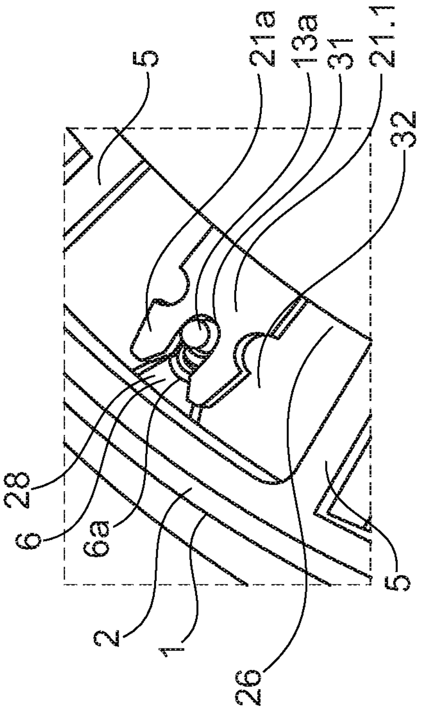
FIG. 4B: shows a detailed view of a formed vessel with a contact point still exposed.

FIG. 4B shows a detailed view of the middle vessel 32 formed between two frame-shaped projections 5 with the contact point 31 still exposed therein. In particular, FIG. 4B clearly shows that the concave curved end 6*a* of the side closure element 6 rests on the wire end 13*a* of the lead wire, which is inserted into the forked end 21*a* of the connecting element 21.1 protruding from the side wall 26. In the same way, each of the recesses 28, both in the first cutout area 29 and in the second cutout area not shown in the figures FIG. 4A and FIG. 4B, is closed at least to such an extent that no casting compound, for example epoxy resin, can escape during casting.

The vessels 32 formed by mounting the side closure ring segments 1 to the cluster 16 are suitable for receiving casting compound, but, as shown in the figures FIG. 3, FIG. 4A and FIG. 4B, they are not yet filled with it, so that the contact points 31 are not yet insulated and are exposed.

Figure 5:
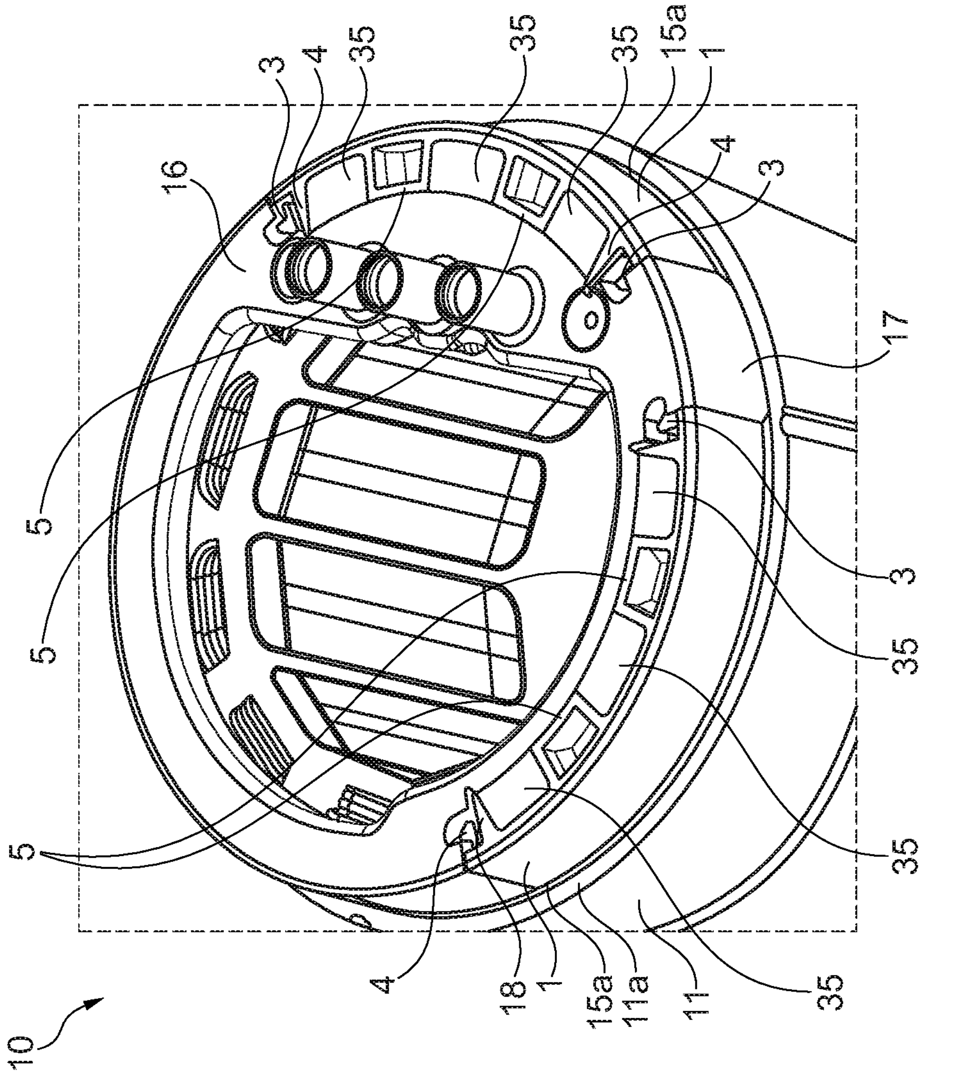
FIG. 5: shows a perspective representation of the stator unit with a view of the cluster with the two mounted side closure ring segments and cast, electrically insulated contact points.

FIG. 5 shows a corresponding stator unit 10, in which the vessels, which were generated by assembling the cluster 16 placed on the stator core 11 with the side closure ring segments 1 and in which the contact points are located, are filled with an insulating filling material 35, for example epoxy resin. By casting with the insulating filling material 35, the contact points that are not visible in FIG. 5 are electrically insulated. The radial projections 4, 5 provide boundary walls and thus enable the formation of the vessels for receiving the liquid casting compound 35 of the insulating filling material. The design of the radial projections 4, 5 and their arrangement in the side closure ring segment 1 serve to hold the casting compound 35 securely and to save as much casting compound 35 as possible.

Mounting a stator unit 10 usually comprises the following steps:

In a first step I, the stator core 11 is provided with basic insulation made of plastic, such as, for example, polyamide PA66. This can be done by overmolding. In this case, on the axial wall surface 11*a* of the stator core 11, two wall steps 15*a* spaced apart from one another in the circumferential direction of the stator core 11 are shaped by the basic insulation.

In a second step II, the wire ends are aligned in the axial direction so that they can be inserted into the connecting elements of the conductor parts, for example the connecting elements of the busbar star circuit and the phase connections, during mounting the cluster 16 on the stator core 11 provided with the basic insulation.

In a third step III, the cluster 16 is mounted on the overmolded stator core 11 provided with the basic insulation and is applied with the cluster base parts 17, 18 to an axial wall surface 11*a* of the stator core 11. Then, the wire ends are connected to the connecting elements of the conductor parts at contact points, these conductor parts being components of the cluster 16.

To insulate the wire ends and connecting elements connected to each other in each case, said wire ends and connecting elements can preferably be cast with an epoxy resin as a casting compound 35, the side closure ring segments 1 being used for the purpose of applying casting compound 35 more securely and thus saving money. In a fourth step IV, the side closure ring segments 1, which have several radial projections 4, 5 as elements for securing casting compound 35, are clamped to the cluster 16 by means of clamp elements 3. This happens either in a radial and/or an axial direction or a combination of both directions. Preferably, the two side closure ring segments 1 are designed to be shorter in the axial direction than the cluster base parts 17 and 18 and, unlike these, do not rest on the axial wall surface 11*a* of the stator core 11, but are placed in each case on one of the special wall steps 15*a* of the overmolded stator core 11 formed by the basic insulation to meet the insulation coordination requirements with regard to air gap and leakage current in the wiring area of the stator unit 10. By mounting the side closure ring segments 1 on the cluster 16, six vessels 32 are formed according to the figures FIG. 3 and FIG. 5, which, in each case, can surround a contact point 31 and receive casting compound of insulating filling material 35 and prevent loss thereof.

Finally, in a final step V, the six vessels are filled with a casting compound of an insulating filling material 35, preferably with an epoxy resin, in order to cover the contact points that are located inside the vessels for the purpose of insulation. Mounting the stator unit 10 is now complete.

Figure 6:
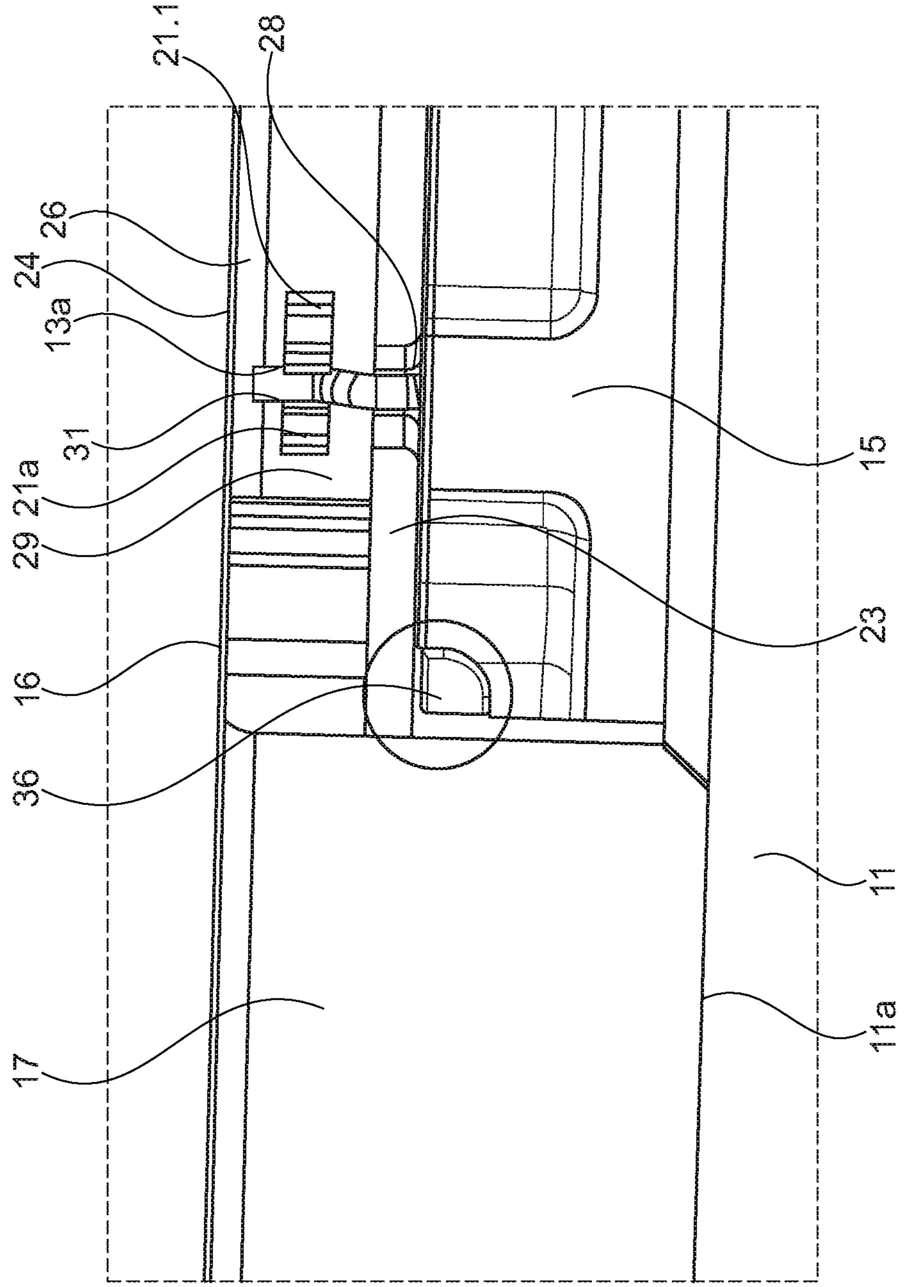
FIG. 6: shows a partial view of the assembly of the stator core and the cluster, a cluster base part with a lateral projection and a cutout area adjacent to the cluster base part.

FIG. 6 shows part of the assembly of the overmolded stator core 11 and the cluster 16 corresponding to the situation after the above-mentioned step III of mounting, in which the cluster 16 is mounted on the overmolded stator core 11 provided with the basic insulation 15 and thereby has been applied to an axial wall surface 11*a* of the stator core 11 with several cluster base parts. FIG. 6 shows a first cluster base part 17 and a part of a side closure area or first cutout area 29 adjacent to it. In the part of the cutout area 29 shown, a wire end 13*a* of a coil or a coil strand is passed in the axial direction through a radial recess 28 on the outer edge of the base plate 23 in the cutout area 29. In the further axial course, the wire end 13*a* is inserted into the forked end 21*a* of a correspondingly radially aligned connecting element 21.1 which protrudes from a side wall 26 of the insulation cover 24, and forms a contact point 31 with it. In addition, in the area of an inside of the first cluster base part 17 in the circumferential direction of the stator core 11 laterally projecting wall elements 36 are formed on both sides, of which only one wall element 36 projecting into the first cutout area 29 is visible in FIG. 6. These wall elements 36 have the function of closing a narrow direct air gap between the coil and the metal of a motor housing, which would remain once the stator unit with the cluster assembly comprising the cluster 16 and the side closure ring segments not yet attached in step III, is mounted within the motor housing.

Figure 7:
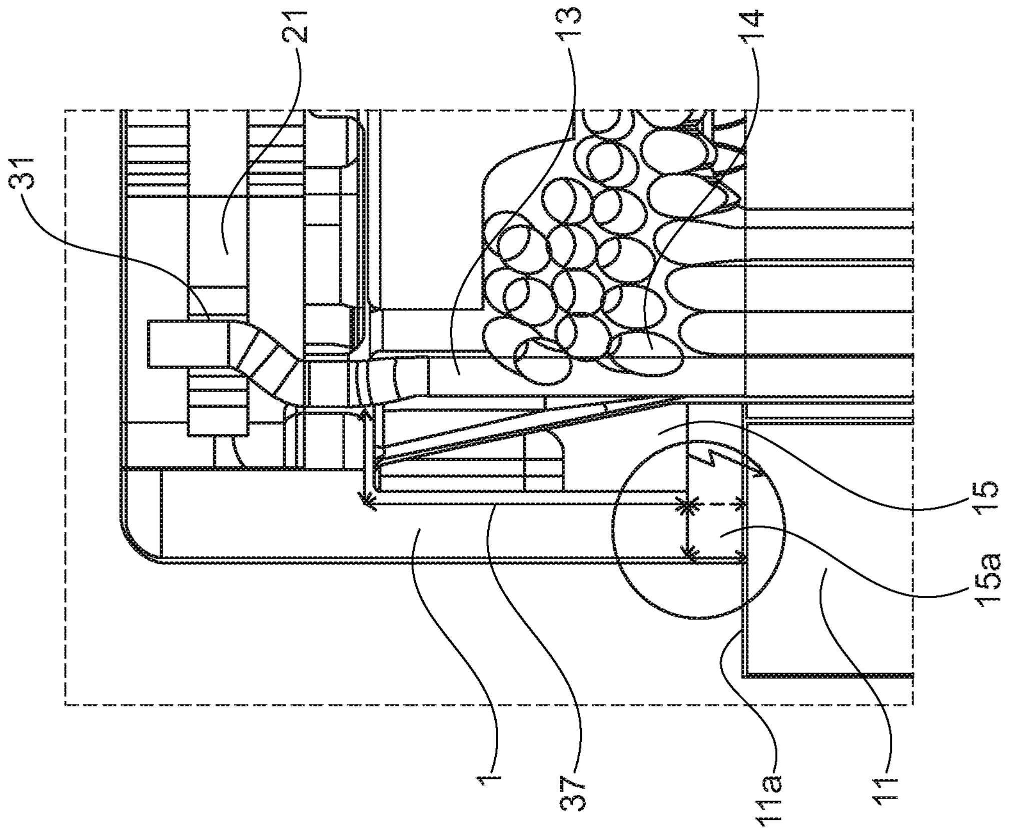
FIG. 7: shows a sectional view of a part of the stator unit in the area of a side closure ring segment with a wall step and an adjacent coil.
Figure 8A:
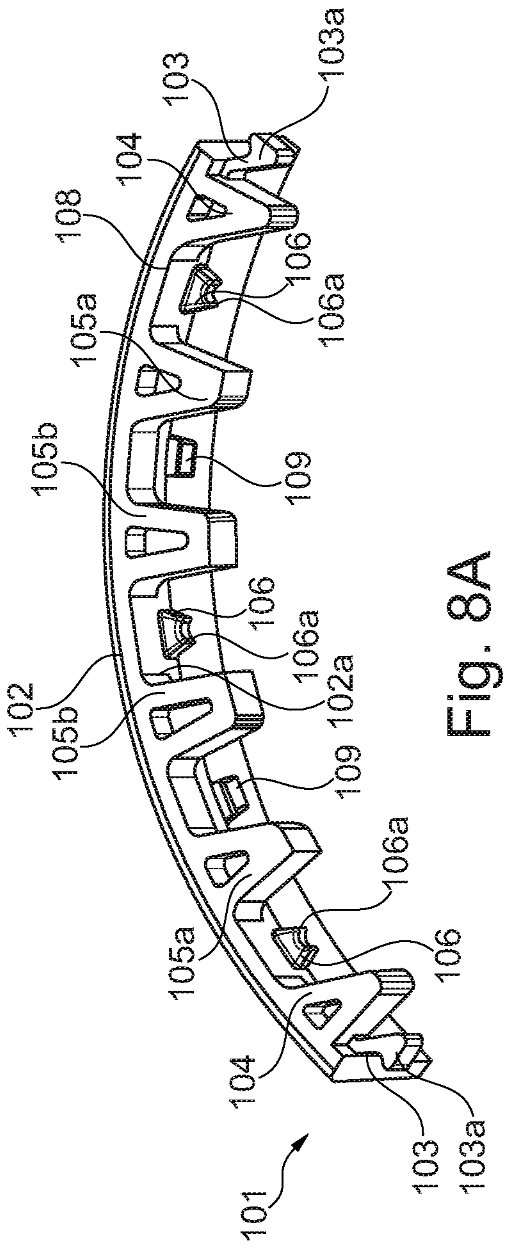
FIG. 8A: shows a perspective view of a side closure ring segment according to this further embodiment of the invention with a view of its inside.
Figure 8B:
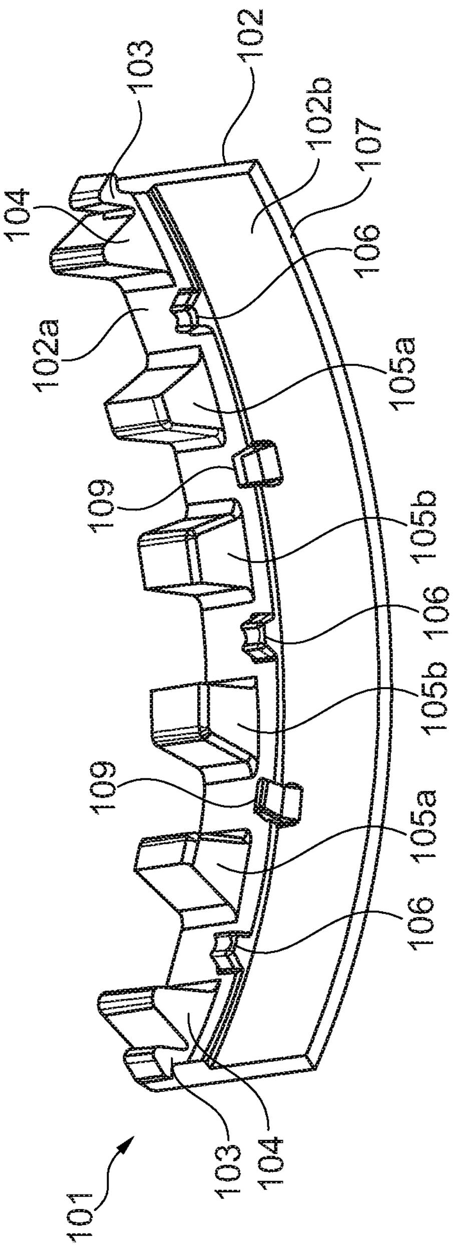
FIG. 8B: shows a perspective view of a side closure ring segment according to this further embodiment of the invention with a view of the surfaces of the side closure ring segment facing outwards in the axial direction of the stator unit.

FIG. 7 shows a sectional view of a part of the stator unit with a side closure ring segment 1 clamped to the cluster 16 according to the above-mentioned step IV. The side closure ring segment 1 rests with its contact surface 7 on the wall step 15*a*, which is shaped on the axial wall surface 11*a* of the stator core 11 by the basic insulation 15. That is to say that, in contrast to the cluster base parts, the side closure ring segment 1 is not placed directly on the axial wall surface 11*a* of the stator core 11. FIG. 7 also shows a coil 14 placed in the radial direction behind the side closure ring segment 1 and the basic insulation 15, as well as a contact point 31 at which a connecting element 21 is connected to a wire end of the lead wire or coil wire 13. The wall step 15*a* extends the leakage current length 37 from the conductive part, the coil wire 13, to the metal of the axial wall surface 11*a* of the stator core 11 to meet the leakage current requirements in stator units in electrically operated refrigerant compressors. Within the scope of the present invention, there are also other possible shapes and arrangement patterns of projections for the side closure ring segments 1 than those shown in FIGS. 1 to 7. The only necessary condition is that these projections and arrangement patterns fulfill the function of forming cavities or vessels together with the cluster in order to be able to cast and thus insulate exposed winding ends, wherein only a small volume should be created for casting. A correspondingly constructed side closure ring segment 101 is shown in figures FIG. 8A and FIG. 8B, which show the side closure ring segment 101 from different perspectives. FIG. 8A is a perspective representation of the side closure ring segment 101 with a view of its upper surface 108, which faces upwards or axially outwards after installation in the stator unit. The side closure ring segment 101 comprises an outer curved ring segment wall 102 with a convexly curved outside and a concavely curved inside. In an upper part 102*a* of the outer ring segment wall 102, a plurality of radial projections are formed on the concave inside. At each of the two ends of the ring segment wall 102 that are opposite in the direction of curvature of the ring segment wall 102, a radial projection is formed in the shape of an outer clamp element 103, which has a hook-shaped end 103*a* pointing outwards in the direction of curvature. The clamp elements 103 serve to hold and position the side closure ring segment 101 after mounting on a cluster as shown in FIG. 8. Furthermore, several differently shaped radial projections 104, 105*a*, 105*b* are placed in the direction of curvature on the inside of the outer ring segment wall 102 between the outer clamp elements 103. There are two radial projections 104, which are each positioned adjacent to one of the outer bracket elements 103 in the direction of curvature and which have a base area which corresponds to a right-angled triangle with a rounded free corner, the hypotenuse of which is on the inner side of the projection 104 directed to the center of the side closure ring segment 101 relative to the direction of curvature. Further inside, a total of four prism-shaped projections 105*a*, 105*b* are arranged spaced apart in the direction of curvature. Here, two adjacent central projections 105*b* have an at least approximately symmetrical, isosceles trapezoidal shape as a base area, while the two remaining projections 105*a*, which are arranged further out, are each positioned between a central projection 105*b* and a projection 104 located adjacent to one of the clamp elements 103, each have a right-angled trapezoidal shape, the right angle being further out in the direction of curvature than the opposite side of the trapezoidal shape of a projection 105*a*. According to the embodiment shown in FIG. 8A, all projections 104, 105*a*, 105*b* are provided with recesses on their top. In addition, another three projections are placed on the inside of the outer ring segment wall 102, which are referred to as side closing elements 106. Each of these side closing elements 106 is located at a lower edge of the upper part 102*a* of the outer ring segment wall 102 and are distributed in the direction of curvature so that they are always positioned between radial projections 104, 105*a*, 105*b* in the direction of curvature. As can be seen in FIG. 8A, the free ends 106*a* of these radial projections or side closing elements 106 have a concave curvature with the same direction of curvature as the direction of curvature of the ring segment wall 102. In addition, a total of two lower clamp elements 109 are positioned each as radial projections below a gap between a central prism-shaped projection 105*b* and an adjacent prism-shaped projection 105*a* located further out.

FIG. 8B shows the side closure ring segment 101 with a view of the concavely curved inside and a contact surface 107 of the side closure ring segment 101, which points into the interior of the stator unit in the axial direction when the side closure ring segment 101 is installed and contacts an axial wall surface of the overmolded stator core or a wall step formed by the basic insulation. From FIG. 8B it is evident that the lower edge of the upper part 102*a* and thus the entire upper part 102*a* of the outer ring segment wall 102 protrudes radially inwards compared to the lower part 102*b* of the outer ring segment wall 102. At this lower edge of the upper part 102*a* of the outer ring segment wall 102, as already mentioned, side closing elements 106 are arranged as radial projections on the inside of the ring segment wall 102 distributed in the direction of curvature. The two lower clamp elements 109 are designed as radial projections immediately below the edge of the upper part 102*a*. In contrast to the outer clamping elements 103, the side closing elements 106 and the projections 104, 105*a*, 105*b* which protrude on the inside of the upper part 102*a*, these lower clamping elements 109 are located on the inside of the lower part 102*b* of the outer ring segment wall 102. The lower clamp elements 109 are arranged adjacent to the lower edge of the upper part 102*a* in the direction of curvature between two side closing elements 106. Thus, in addition to the two larger, outer clamping elements 103 which are provided for engaging laterally a top of a cluster for attachment to said cluster, the side closure ring segment 101 has two smaller, lower clamp elements 109, which can engage a bottom of the cluster in order to hold and position the side closure ring segment 1 after mounting.

Figure 9:
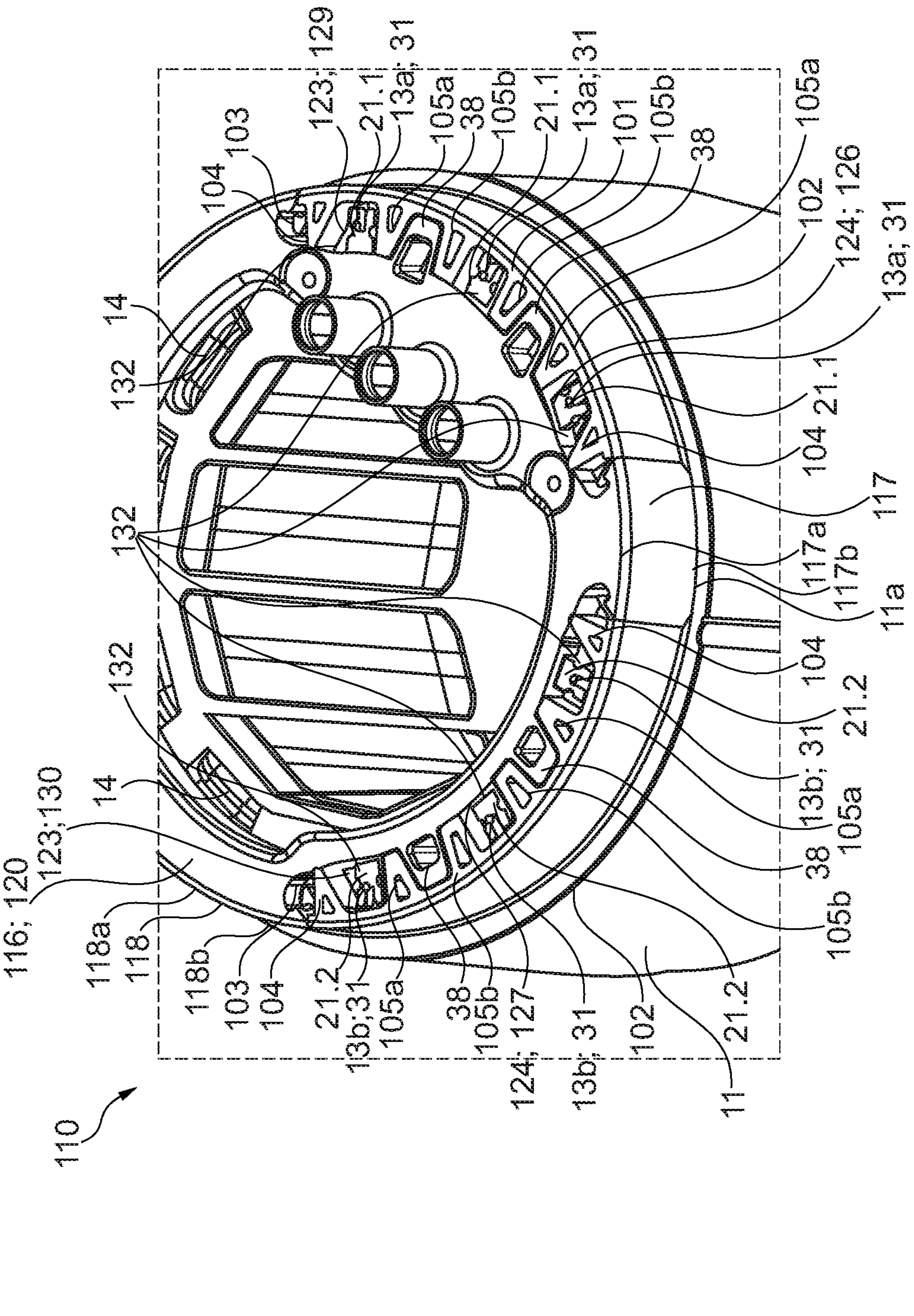
FIG. 9: shows a perspective representation of a partial area of the stator unit according to the further embodiment of the invention with a view of a part of the cluster with two mounted side closure ring segments and with exposed contact points that have not yet been cast.

FIG. 9 shows a perspective view of a stator unit 110, in which two side closure ring segments 101 are mounted on a cluster 116 placed on a stator core 11. The embodiment shown differs from the embodiment shown in figures FIG. 2 to FIG. 4 not only with regard to the shape of the side closure ring segments 101, but also with regard to the shape of the cluster 116. Also in the cluster 116 shown in FIG. 9, at contact points 31, connecting elements 21.1, 21.2 of conductor parts, which are enclosed by an annular support part 120, are each passed through a side wall 126; 127 of an insulation cover 124 of a support part 120 in the radial direction. The connecting elements 21.1, 21.2 extend with their forked end in the radial direction in a total of two cutout areas 129, 130 above the base plate 123, the base plate 123 resting against the side walls 126, 127 in these cutout areas 129, 130 and not being covered by the insulation cover 124 is and runs with an arcuate outer contour along the outer circumference of the annular cluster 116 or the outer circumference of the annular support part 120. On the outer edges of the cutout areas 129, 130, several, in this case a total of six, radial V-shaped recesses are formed, which are covered by the side closure ring segments 101 in FIG. 9. Each of the total of six connecting elements 21.1, 21.2 extends with its forked end up to a position above one of the radial V-shaped recesses on the outer edges of the base plate 123 in the cutout areas 129, 130. A wire end 13*a*; 13*b* of a coil or a coil strand passes through each of the radial recesses in the axial direction. The forked ends of the connecting elements 21.1, 21.2 are aligned in such a way that the wire ends 13*a*; 13*b* running in the axial direction are inserted from below, that is to say, coming from the coils 14 in the stator core 11, into the forked ends.

The support part 120 of the cluster 116 further comprises a first, smaller cluster base part 117 and a second, larger cluster base part 118, each with a first end 117*a*; 118*a* connected to the insulation cover 124 and with a second end 117*b*; 118*b* resting on an outer axial wall surface 11*a* of the stator core 11. Here, the cluster base parts 117, 118 are directed downwards with their respective second ends 117*b*; 118*b* in the axial direction, that is to say, directed towards the stator core 11, and run over the outer edge of the base plate 123 to the axial wall surface 11*a* of the stator core 11, which is located below the plane of the base plate 123. The two arcuate cluster base parts 117, 128 each run along different, differently sized areas of the outer circumference of the circular ring-shaped support part 120 of the cluster 116, with the insulation cover 124 in these areas extending in the radial direction up to the outer edge of the annular support part 120. The arcuate cluster base parts 117, 118 are spaced apart from one another on both sides in the circumferential direction. The two cutout areas 129, 130, which are not covered by the insulation cover 124, extend each in the circumferential direction between the two cluster base parts 117, 118 and also between the areas of the insulation cover 124 adjacent to the cluster base parts 117, 118. In contrast to the radial side walls of the cluster shown in FIG. 2 to FIG. 4, radial protuberances 38 in the form of prism-shaped hollow bodies with a substantially trapezoidal base area in each case are formed on the radial side walls 126, 127 of the insulation cover 124 of cluster 116 shown in FIG. 9. The total of four radial protuberances 38 are distributed here in the circumferential direction so that they are each placed between two pass-through connecting elements 21.1; 21.2. The protuberances 38 extend from the respective side wall 126; 127 up to the outer edge of the base plate 123 in the respective cutout area 129; 130.

By mounting the side closure ring segments 101 to the cluster 116, the gaps between the circular arc-shaped cluster base parts 117, 118 are closed on the outer circumference of the support part 120 or on the outer edges of the cutout areas 129, 130. Consequently, a closed outer ring, comprising the cluster base parts 117, 118 and the outer ring segment walls 102 of the two side closure ring segments 101, is obtained, which encloses the support part 120 of the cluster 116 over the entire circumference, including the outer edges of the cutout areas 129. 130. In conjunction with clamp elements 103 with which the side closure ring segments 101 are attached to the cluster 116, the side closure ring segments 101 are also referred to as "outer ring closing clamps" according to their function. The vessels 132 created by mounting the side closure ring segments 101 are not yet filled with casting material as shown in FIG. 9, so that the contact points 31 of the wire ends and connecting elements of the conductor parts are not yet insulated and are exposed. The structure of the side closure ring segments 101 partially corresponds to the radial protrusions 38 on the radial side walls 126, 127 of the insulation cover 124, in that the radial protrusions 38 each fill a space between two adjacent radial projections 105*a*, 105*b* of the mounted side closure ring segments 101.

Figure 10:
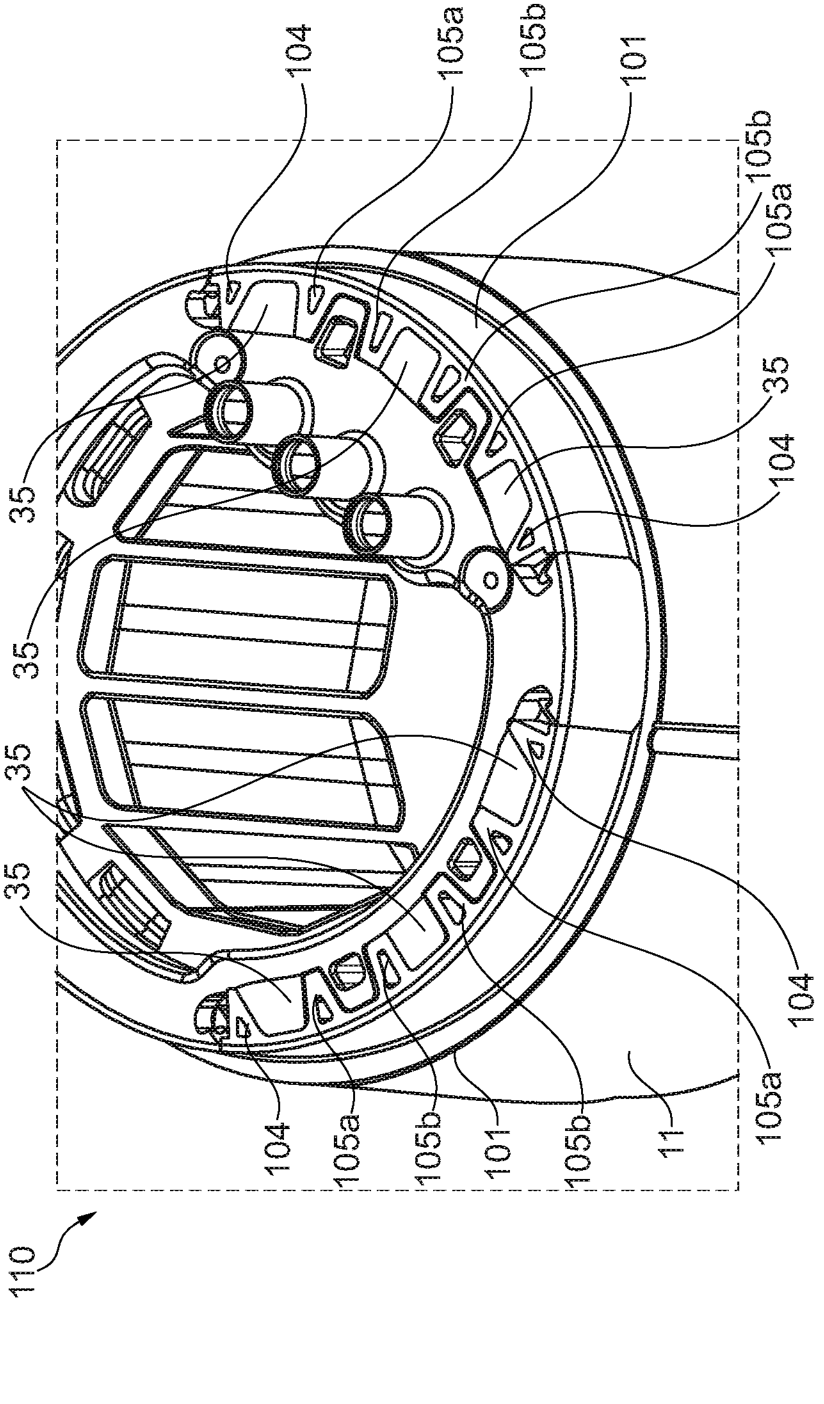
FIG. 10: a perspective representation of the stator unit with a view of the cluster with the two mounted side closure ring segments and cast, electrically insulated contact points.

FIG. 10 depicts a corresponding stator unit 110, in which the vessels that were generated by assembling the cluster assembly from the cluster 116 placed on the stator core 11 and the side closure ring segments 101 and in which the contact points are located, are filled with an insulating filling material 35, for example epoxy resin. By casting with the insulating filling material, the contact points that are not visible in FIG. 10 are electrically insulated. The radial projections 104, 105*a*, 105*b* provide boundary walls and thus enable the formation of the vessels for receiving the liquid casting compound 35 of the insulating filling material 35. The design of the radial projections 104, 105*a*, 105*b* and their arrangement in the side closure ring segment 101 serve to hold the casting compound 35 securely and to save as much casting compound as possible.

Figure 11:
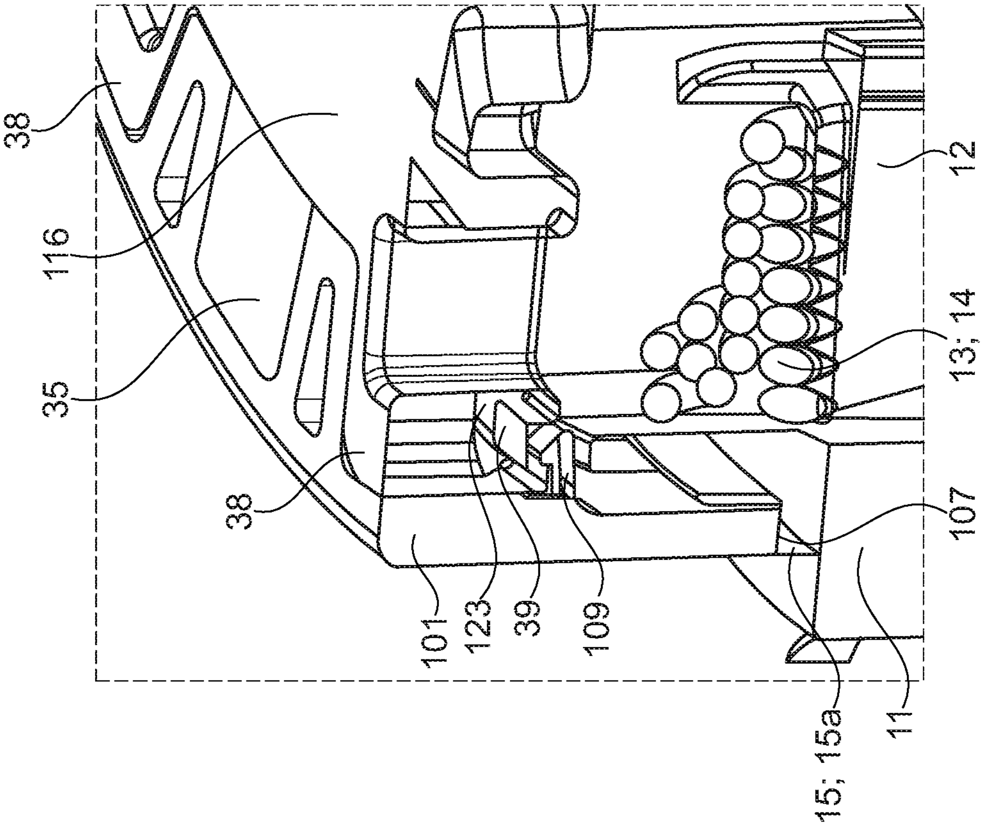
FIG. 11: shows a sectional representation of an area of the stator unit with a sectional plane running through the wall of the stator core, a coil web and lead wires wound around it to form coils, the cluster and a side closure ring segment.

FIG. 11 combines a perspective view of a part of the fully mounted stator unit cast with insulating filling material 35 with a radial sectional representation, the sectional plane of which runs through the wall of the stator core 11, a coil web 12 with lead wires 13 wound into coils 14, the cluster 116 and a side closure ring segment 101. The sectional plane runs at a position of the side closure ring segment 101, at which a lower clamp element 109 of the side closure ring segment 101 engages a corresponding clamp receiving element 39 on the underside of the base plate 123 of the cluster 116. This corresponding clip receiving element 39 is located below one of the radial protuberances 38 of the cluster 116. The base plate 123 is reinforced at this point by the radial protuberances 38, which can increase the stability of the clamp connection between the side closure ring segment 101 and the cluster 116. In this embodiment shown also, the side closure ring segment 101 is placed on the wall step 15*a* formed by the basic insulation 15 with its contact surface 107, the wall step 15*a* and the basic insulation 15 being shown transparently in FIG. 11 and therefore not visible.

Figure 12:
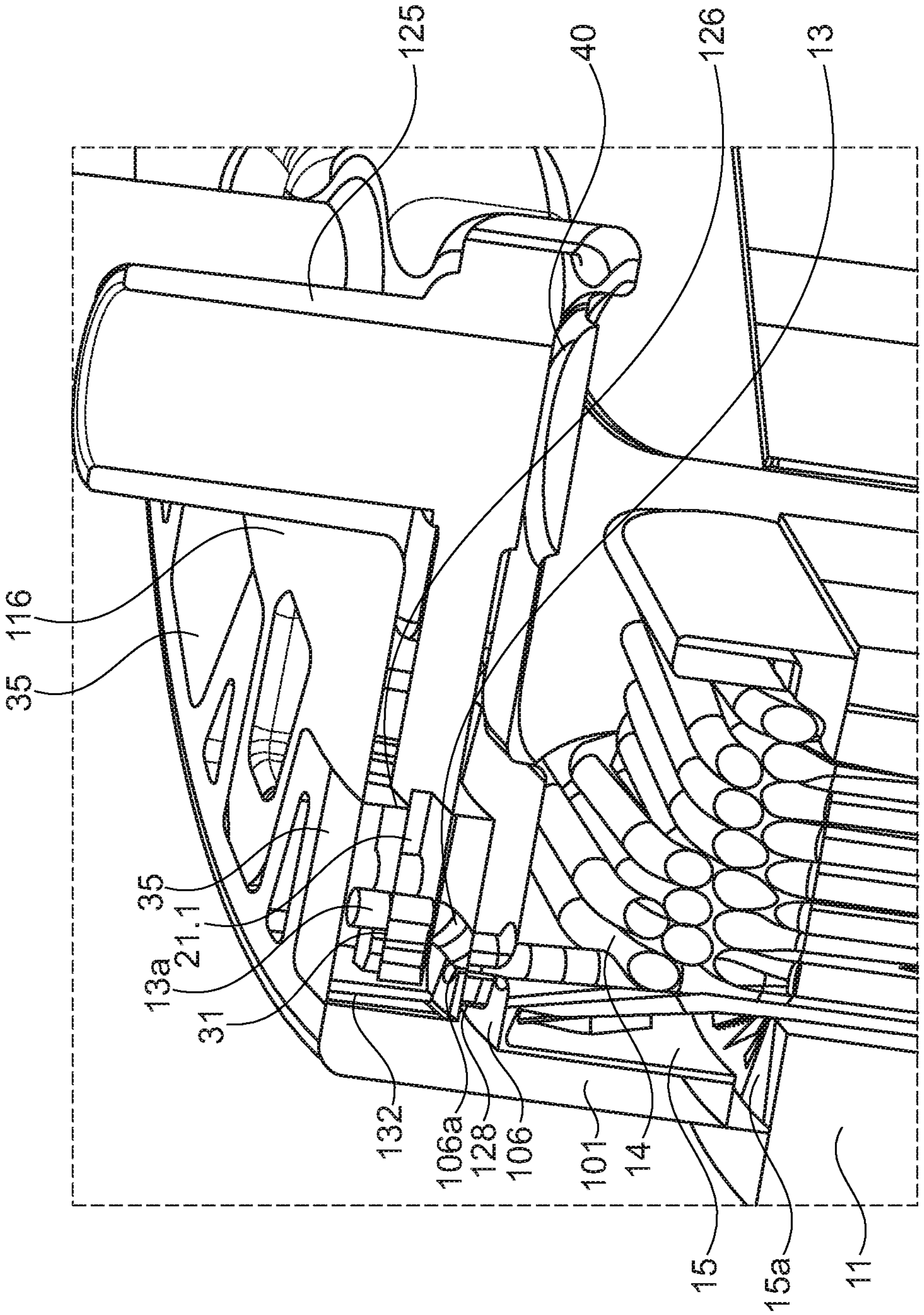
FIG. 12: shows a sectional representation of a further area of the stator with a sectional plane running through the wall of the stator core, a coil web and lead wires wound around it to form coils, the cluster and a side closure ring segment.

FIG. 12 also combines a perspective view of a part of the fully mounted stator unit cast with insulating filling material 35, with a schematic radial sectional representation. Here, the sectional plane runs through the wall of the stator core 11, the basic insulation 15 and the wall step 15*a* formed by the basic insulation, through the lead wires 13 of a coil, through the cluster 116 and a side closure ring segment 101 which is placed on the wall step 15*a*. The sectional plane runs at a position of the side closure ring segment 101, at which a side closing element 106, which corresponds to a radial recess 128 on the outer edge of the base plate 123, at which the lead wire 13 passes through the base plate 123 to the vessel 132 formed by the mounting of the side closure ring segment 101 on the cluster 116, in which a contact point 31 is located. As FIG. 12 clearly shows, the concavely curved end 106*a* of the side closing element 106 rests on the lead wire 13. In this way, the recesses 128 are enclosed by the side closing element 106 at least to such an extent that no casting compound can escape when the insulating filling material 35 is cast. FIG. 12 also shows a simplified section of a sleeve 125, which surrounds a line element (not shown) of the interface to a motor drive control unit, the conductor part 40 of the connecting element 21.1 connected to it also not being visible in detail, but only its position. This conductor part 40 is one of the three first conductor parts, each of which is connected to one of the three first connecting elements 21.1. For the electrical connection of the line element which is itself sleeve-shaped for receiving a plug connector (E-pin), to the conductor part, such a conductor part usually has an annular plug receptacle as a connecting part, into which the sleeve-shaped line element is inserted vertically for electrical contacting. Starting from the annular connection part of the conductor part, the connecting element 21.1 extends in the radial direction through a radial side wall 126 of the insulation cover into a cutout area 129, where it is electrically connected to the wire end 13*a* of the lead wire 13 of a phase at the contact point 31.

LIST OF REFERENCE NUMERALS

1 side closure ring segment
2 outer ring segment wall
2*a* upper part of the outer ring segment wall 2
2*b* lower part of the outer ring segment wall 2
3 outer clamp elements
3*a* hook-shaped end of an outer clamp element 3
4 simple radial projection on the inside of the outer ring segment wall 2

5 frame-shaped radial projection on the inside of the outer ring segment wall 2
6 side closing element
6*a* end of a side closing element 6
7 contact surface of the side closure ring segment 1
8 top surface of side closure ring segment 1
9 lower clamp element
10 stator unit
11 stator core
11*a* axial wall surface of the stator core 11
12 coil webs
13 lead wires, coil wires
13*a* wire ends
13*b* wire ends
14 coils
15 basic insulation
15*a* wall step
16 cluster
17 cluster base part, smaller cluster base part
17*a* first end of the smaller cluster base part 17
17*b* second end of the smaller cluster base part 17
18 cluster base part, larger cluster base part
18*a* first end of the larger cluster base part 18
18*b* second end of the larger cluster base part 18
19 interface
20 support part
21 connecting element of a conductor part
21.1 connecting element of a conductor part (phase connection)
21.2 connecting element of a conductor part (star point circuit)
21*a* forked end of a connecting element 21
22 line elements of the interface 19
23 base plate
24 insulation cover
25 tubular sleeve of the insulation cover
26 side wall of the insulation cover
27 side wall of the insulation cover
28 radial recess on the outer edge of the base plate 23
29 cutout of the insulation cover
30 cutouts of the insulation cover
31 contact point
32 vessel
33 recess in the support part 20 for clamp element 3
34 recess in the support part 20 for a radial projection 4
35 insulating filling material, casting compound
36 laterally protruding wall element
37 leakage current length
38 radial protuberances
39 clamp receiving element
40 first conductor part
101 side closure ring segment
102 outer ring segment wall
102*a* upper part of the outer ring segment wall 102
102*b* lower part of the outer ring segment wall 102
103 outer clamp element
103*a* hook-shaped end of the outer clamp element 103
104 radial projection on the inside of the outer ring segment wall 102
105*a* radial projection on the inside of the outer ring segment wall 102
105*b* radial projection on the inside of the outer ring segment wall 102
106 side closing element
106*a* end of a side closing element 106
107 contact surface of the side closure ring segment 101
108 upper surface of side closure ring segment 101
109 lower clamp element
110 stator unit
116 cluster
117 cluster base part, smaller cluster base part
117*a* first end of the smaller cluster base part 117
117*b* second end of the smaller cluster base part 117
118 cluster base part, larger cluster base part
118*a* first end of the larger cluster base part 118
118*b* second end of the larger cluster base part 118
120 support part of cluster 116
123 base plate
124 insulation cover
125 tubular sleeve of the insulation cover
126 radial side wall of the insulation cover 124
127 radial side wall of the insulation cover 124
128 radial recess on the outer edge of the base plate 123
129 cutouts of the insulation cover
130 cutouts of the insulation cover
132 vessel

What is claimed is:

1. A cluster assembly for coil connection, electrical contact, and electrical insulation of a stator unit of an electric motor driving a refrigerant compressor, the cluster assembly comprising:

an annular cluster comprising:

an injection-molded annular support part with an over-molded insulating cover;

three first connecting elements for a connection to wire ends of three-phase wires of a stator winding on one side of a stator core of the stator unit; and three first conductor parts, each connected with one of the first connecting elements; and three second connecting elements of a common second conductor part for an electrical connection of three wire ends to one another on a side of the stator winding opposite the connection to wire ends to the first connecting elements, wherein the cluster has cutout areas without the insulating cover, in which the first connecting elements and/or the second connecting elements project radially outwards from the support part of the cluster and protrude axially outwards from the support part of the cluster; and at least one side closure ring segment securing the connection to wire ends to the first connecting elements or the connection to wire ends to the second connecting elements and insulation through a mounting connection on an outer circumference of the cluster, wherein the at least one side closure ring segment is shaped and dimensioned to be directly received within a corresponding one of the cutout areas of the cluster that is free of the insulating cover of the cluster in each case.

2. The cluster assembly according to claim 1, wherein several vessels are formed for filling with an electrically insulating filling material by assembling the at least one side closure ring segment with the cluster in at least one of the cutout areas, each of which encloses a space around a contact point of one of the first connecting elements or the second connecting elements with one of the corresponding wire ends.

3. The cluster assembly according to claim 1, wherein the at least one side closure ring segment is embodied as a one-piece plastic injection-molded part.

4. The cluster assembly according to claim 1, wherein the cutout areas each have radial recesses on outer edges of the cutout areas through which each of the wire ends can be passed axially in a direction of a contact point of the first connecting elements and the second connecting elements, and that the at least one side closure ring segment has a number of side closing elements distributed in a direction of curvature of a ring segment wall on an inside of the ring segment wall, which correspond to the radial recesses in a respective one of the cutout areas in terms of shape, number and distribution, whereby the radial recesses are at least partially closed.

5. The cluster assembly according to claim 4, wherein the at least one side closure ring segment includes clamp elements of a snap connection system configured to mount the at least one side closure ring segment on the cluster.

6. The cluster assembly according to claim 5, wherein the at least one side closure ring segment has two outer clamp elements which are designed in a form of a radial projection on each of two ends of the ring segment wall of the at least one side closure ring segment that are opposite each other in the direction of curvature of the ring segment wall, which projection has a hook-shaped end pointing outwards in the direction of curvature.

7. The cluster assembly according to claim 4, wherein the at least one side closure ring segment has at least two lower clamp elements which are positioned and arranged on the inside of the ring segment wall so that they engage an underside of a base plate of the cluster.

8. A stator unit comprising:

a stator core having at least substantially a shape of a hollow cylinder, which has coil webs on an inside that are arranged to be evenly distributed over a circumference of the stator core and directed radially inwards relative to a cross section of the stator core, wherein lead wires forming coils are wound around the coil webs, which are divided into at least three phases, and wherein the stator core is provided with a basic insulation formed between the stator core and the coils;

the cluster assembly according to claim 1, wherein the cluster is placed on an axial wall surface of the stator core of the stator unit, and the first connecting elements and the second connecting elements of the first conductor parts and the second conductor parts are connected in each case to the wire ends of the lead wires of the coils passing through a recess in a base plate in an axial direction at contact points in the cutout areas, and wherein vessels enclosing a space around one of the contact points in each case, which are formed by assembling the cluster with the at least one side closure ring segment, are filled with an electrically insulating filling material.

9. The stator unit according to claim 8, wherein the at least one side closure ring segment is placed on a wall step formed by the basic insulation on the axial wall surface of the stator core.

10. A method for producing a stator insulation system for a stator unit, the method comprising steps of:

providing a stator unit including a stator core and a cluster assembly, the cluster assembly including an annular cluster, wherein the cluster comprises:

an injection-molded annular support part with an overmolded insulating cover;

three first connecting elements for a connection to wire ends of three-phase wires of a stator winding on one side of the stator core; and three first conductor parts, each for a connection to one of the first connecting elements; and three second connecting elements of a common second conductor part for an electrical connection of three wire ends to one another on a side of the stator winding opposite the connection to wire ends to the first connecting elements, wherein the cluster has cutout areas without the insulating cover; and at least one side closure ring segment for securing the connection to wire ends to the first connecting elements or the connection to wire ends to the second connecting elements and insulation through a mounting connection on an outer circumference of the cluster, wherein the at least one side closure ring segment is shaped and dimensioned to be directly received within a corresponding one of the cutout areas of the cluster that is free of the insulating cover of the cluster in each case;

overmolding the stator core, on an inside of which the coil webs directed radially inwards relative to a cross section of the stator core and around which lead wires are completely wound to form coils, are arranged to be evenly distributed over a circumference of the stator core, with a plastic for formation of a basic insulation;

aligning wire ends of the lead wires in an axial direction;

mounting the cluster on the stator core provided with the basic insulation, the cluster being placed on an axial wall surface of the stator core and the wire ends being connected to the first connecting elements and the second connecting elements of the first conductor parts and the second conductor parts of the cluster at contact points;

attaching at least one side closure ring segment, wherein vessels surrounding one of the contact points in each case are formed by mounting the at least one side closure ring segment on the cluster; and filling the vessels with a casting compound of an insulating filling material.

11. The method according to claim 10, wherein the at least one side closure ring segment is mounted on the cluster in a radial direction, in the axial direction, or in a combination of both the radial direction and the axial direction.

12. The method according to claim 10, wherein the insulating filling material is an epoxy resin.

* * * * *